J. H. MERRILL.
Match Safe.
No. 49,542.  Patented Aug. 22, 1865.
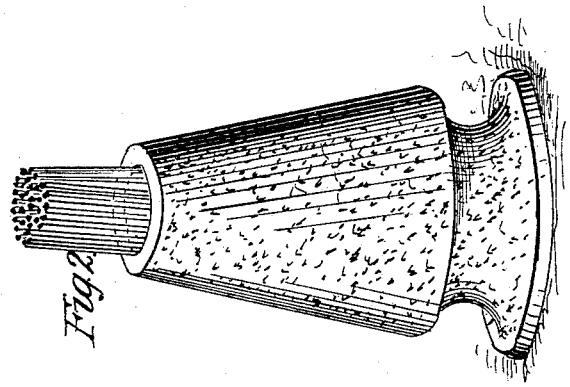
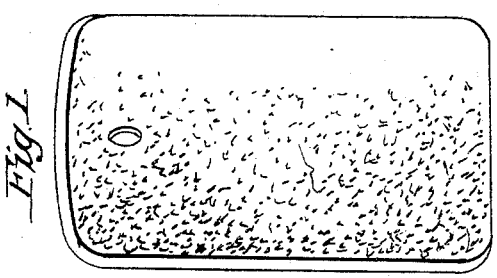

UNITED STATES PATENT OFFICE.

JASON H. MERRILL, OF NORWALK, CONNECTICUT.

IMPROVED MATCH-IGNITER.

Specification forming part of Letters Patent No. 49,542, dated August 22, 1865.

*To all whom it may concern:*

Be it known that I, JASON H. MERRILL, of Norwalk, in the county of Fairfield and State of Connecticut, have invented a new and Improved Match-Igniter; and I do hereby declare that the following is a full, clear, and exact description thereof, which will enable those skilled in the art to make and use the same, reference being had to the accompanying drawings, forming part of this specification, in which—

Figures 1 and 2 are side elevations of examples of my improvement.

The object of this invention is to provide a roughened surface for the ignition of matches so made that the surface will not become spoiled or smoothed by use, and so that all parts of said surface will be alike rough.

My material of which my improved match-igniter is composed consists of clay and sand. These ingredients are mixed in equal parts with water, and then fashioned or molded in the same manner as pottery or earthen ware into any desired form, and then baked in an oven in the same manner as earthenware is baked. The igniter thus produced will, without any further preparation, have a roughened surface, which is equally rough, forming a durable and admirable surface for the rubbing of matches, the condition or uniformity of the roughened surface being such that if a match is struck upon said surface at any part thereof the match will be immediately ignited.

My improved igniter may be made in the form of a match-holder, as shown in Fig. 1, or in the form of a flat surface, as shown in Fig. 2, or in any other suitable form. The proportions and qualities of clay and sand may be also varied at will.

Having thus described my invention, I claim as new, and desire to secure by Letters Patent, is—

As an improved article of manufacture, a match-igniter made as herein described.

JASON H. MERRILL.

Witnesses:
 JOSEPH F. FOOTE,
 EDWARD MERRILL.